United States Patent
Matsui

(10) Patent No.: US 8,815,998 B2
(45) Date of Patent: Aug. 26, 2014

(54) MODIFIED NATURAL RUBBER, PRODUCTION PROCESS FOR THE SAME AND RUBBER COMPOSITION AND TIRE PREPARED BY USING THE SAME

(75) Inventor: Takahiko Matsui, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 160 days.

(21) Appl. No.: 13/128,429

(22) PCT Filed: Nov. 10, 2009

(86) PCT No.: PCT/JP2009/069130
§ 371 (c)(1),
(2), (4) Date: May 10, 2011

(87) PCT Pub. No.: WO2010/053198
PCT Pub. Date: May 14, 2010

(65) Prior Publication Data
US 2011/0224365 A1    Sep. 15, 2011

(30) Foreign Application Priority Data

Nov. 10, 2008   (JP) ................................. 2008-287352

(51) Int. Cl.
*C08L 15/00*   (2006.01)
*C08C 19/44*   (2006.01)
*C07C 17/06*   (2006.01)

(52) U.S. Cl.
USPC ...................... 524/572; 525/333.1; 525/331.9

(58) Field of Classification Search
CPC ........ C08K 3/033; C08L 15/00; C08C 19/38; C08C 1/02; C08C 1/04; B60C 1/0016
USPC ............ 524/17, 18, 145, 333, 572; 525/331.9
See application file for complete search history.

(56) References Cited

U.S. PATENT DOCUMENTS

| | | | |
|---|---|---|---|
| 4,537,722 A * | 8/1985 | Stamvik et al. | 552/575 |
| 5,115,035 A * | 5/1992 | Shiraki et al. | 525/314 |
| 5,856,600 A * | 1/1999 | Tanaka et al. | 585/241 |
| 7,825,175 B2 | 11/2010 | Kondou | |
| 8,039,546 B2 * | 10/2011 | Kondou | 524/575.5 |
| 2005/0234186 A1 * | 10/2005 | Kondou | 524/575.5 |
| 2007/0010610 A1 * | 1/2007 | Kondo | 524/493 |
| 2009/0227742 A1 * | 9/2009 | Kondou | 525/350 |
| 2010/0249336 A1 | 9/2010 | Yonemoto | |

FOREIGN PATENT DOCUMENTS

| | | |
|---|---|---|
| CN | 1692128 A | 11/2005 |
| CN | 101065403 A | 10/2007 |
| EP | 1568713 A1 | 8/2005 |
| EP | 1816144 A1 | 8/2007 |
| JP | 05-287121 A | 11/1993 |
| JP | 06-329702 A | 11/1994 |
| JP | 09-025468 A | 1/1997 |
| JP | 2000-319339 A | 11/2000 |
| JP | 2002-138266 A | 5/2002 |
| JP | 2002-348559 A | 12/2002 |
| JP | WO2004/052935   * | 6/2004 |
| JP | 2006-213878 A | 8/2006 |
| JP | 2007-056205 A | 3/2007 |
| JP | 2007-138088 A | 6/2007 |
| JP | 2009-108204 A | 5/2009 |
| WO | 2004/052935 A1 | 6/2004 |
| WO | 2004/106397 A1 | 12/2004 |
| WO | 2006/057343 A1 | 6/2006 |

OTHER PUBLICATIONS

International Preliminary Report on Patentability for PCT/JP2009/069130 dated Jun. 30, 2011.
Extended European Search Report issued Jul. 24, 2012 in European Patent Appln. No. 09824895.8 to Bridgestone Corporation.

* cited by examiner

*Primary Examiner* — Liam J Heincer
*Assistant Examiner* — Marilou Lacap
(74) *Attorney, Agent, or Firm* — Sughrue Mion, PLLC

(57) ABSTRACT

After hydrolyzing a phospholipid bonded to a molecular end of a natural rubber, a compound having a polar group reacting with a hydroxyl group is condensed with a hydroxyl group contained in the phospholipid-hydrolyzed natural rubber to thereby obtain a modified natural rubber in which a polar group is present at a molecular end. The modified natural rubber thus obtained in which a polar group is present at a molecular end is used for a rubber component of a rubber composition, whereby a rubber composition in which carbon black and silica as fillers are bonded to the rubber component to enhance a reinforcing effect and which is excellent in a low hysteresis loss property and abrasion resistance to a large extent is obtained. An enzyme or an alkali is used for hydrolyzing the phospholipid, and a condensing agent is used for condensing the polar group-containing compound.

6 Claims, No Drawings

MODIFIED NATURAL RUBBER, PRODUCTION PROCESS FOR THE SAME AND RUBBER COMPOSITION AND TIRE PREPARED BY USING THE SAME

CROSS REFERENCE to RELATED APPLICATIONS

This application is a National Stage of International Application No. PCT/JP2009/069130filed Nov. 10, 2009, claiming priority based on Japanese Patent Application No. 2008-287352, Nov. 10, 2008, the contents of all of which are incorporated herein by reference in their entirety.

TECHNICAL FIELD

The present invention relates to a modified natural rubber and a rubber composition prepared by using the same, specifically to a modified natural rubber obtained by introducing a polar group into a molecular end of natural rubber, a rubber composition prepared by using the same which is excellent in a low hysteresis loss property and an abrasion resistance and a tire prepared by using the same.

BACKGROUND ART

In recent years, reduction in fuel consumption of cars is increasingly required, and tires having small rolling resistance are required. Accordingly, a rubber composition which is excellent in a low hysteresis loss property and a low heat build-up is required as a rubber composition used for a tread and the like in a tire. Further, excellent abrasion resistance and excellent tensile strength in addition to a low hysteresis loss property are required in a rubber composition for a tread. In contrast with this, it is effective for improving a low hysteresis loss property, abrasion resistance and tensile strength of a rubber composition to enhance affinity of fillers such as carbon black and silica with a rubber component in the rubber composition.

In order to enhance affinity of fillers with a rubber component in a rubber composition to improve a reinforcing effect exerted by the filler, developed are, for example, synthetic rubbers which are improved in affinity with fillers by modifying an end of molecular chain and synthetic rubbers which are improved in affinity with fillers by copolymerizing with functional group-containing monomers.

On the other hand, in respect to natural rubber, techniques in which, for example, a vinyl base monomer is added to natural rubber latex and subjected to graft polymerization therewith are known (refer to patent documents 1 to 6), and grafted natural rubbers obtained by the techniques are put into practical use in applications of adhesives and the like. However, since the such grafted natural rubbers are grafted with a large amount (20 to 50% by mass) of a vinyl compound as a monomer, they increased in a viscosity to a large extent when blended with fillers such as carbon black and silica, and processability becomes worse. Further, since a large amount of the vinyl compound is introduced into a molecular chain of the natural rubber, the characteristics of the natural rubber itself are changed, and the excellent physical characteristics (viscoelasticity, a strain-stress curve in a tensile test and the like) which are intrinsic to the natural rubber become worse. Accordingly, even use of the grafted natural rubbers obtained by the techniques does not make it possible to improve affinity thereof with fillers to enhance a reinforcing effect thereof.

Further, it is proposed to use an epoxidized natural rubber in order to improve flex cracking resistance and strength of a tire (refer to patent document 7).

In contrast with this, disclosed is a technique in which a polar group-containing monomer is added to natural rubber latex to subject the polar group-containing monomer to graft polymerization with a natural rubber molecule in the natural rubber latex and in which the modified natural rubber coagulated and dried is used as a rubber component to thereby enhance affinity of the rubber component with fillers to improve a reinforcing property of the rubber composition and enhance a low hysteresis loss property, an abrasion property and tensile strength of the rubber composition (refer to patent document 8). In recent years, however, it is required to further enhance a low hysteresis loss property and an abrasion property of a rubber composition.

Patent document 1: Japanese Patent Application Laid-Open Hei 5 No. 287121
Patent document 2: Japanese Patent Application Laid-Open Hei 6 No. 329702
Patent document 3: Japanese Patent Application Laid-Open Hei 9 No. 25468
Patent document 4: Japanese Patent Application Laid-Open No. 2000-319339
Patent document 5: Japanese Patent Application Laid-Open No. 2002-138266
Patent document 6: Japanese Patent Application Laid-Open No. 2002-348559
Patent document 7: Japanese Patent Application Laid-Open No. 2007-56205
Patent document 8: International Publication No. 2004-106397

DISCLOSURE OF THE INVENTION

Problems to be Solved by the Invention

An object of the present invention is to provide a rubber composition which is excellent in a low hysteresis loss property (low heat build-up) and an abrasion property than ever to a large extent and a tire prepared by using the rubber composition. Further, another object of the present invention is to provide a modified natural rubber which is suitable as a rubber component for the rubber composition and a production process for the same.

Means for Solving Problem

Intense investigations repeated by the present inventors have resulted in finding that the objects described above can be achieved by using a rubber composition in which a modified natural rubber having a polar group present at a molecular end is used for a rubber component, and thus the present invention has come to be completed.

Graft polymerization of a polar group-containing monomer with a natural rubber molecule in a natural rubber latex makes it possible to introduce the polar group into a main chain of the natural rubber molecule, but considering a chain molecular motion, a functional group present at a molecular end can enhance more interaction with fillers. This is because a polymer has usually a free chain at an end even when it is constrained by reinforcing and cross-linking, so that it can freely move. Further, this is expected from the fact that a modified end of a synthetic rubber exhibits a high modification effect.

As described above, graft polymerization of a polar group-containing monomer with a natural rubber molecule in a natural rubber latex makes it possible to introduce the polar group into a main chain of the natural rubber molecule, but in this case, a position into which the polar group is introduced is not necessarily the molecular end.

A protein and a phospholipid are bonded to a molecular end of natural rubber. It is preferred in the present invention to hydrolyze the phospholipid and then condense a carboxylic acid compound having a polar group, aldehydes having a polar group, isocyanates having a polar group and the like with it to thereby obtain a modified natural rubber in which a polar group is present at a molecular end. Use of the modified natural rubber thus obtained in which a polar group is present at a molecular end as a rubber component of a rubber composition provides a rubber composition which provides fillers with high dispersibility and allows the filler to exert sufficiently a reinforcing effect and which is improved in a low hysteresis loss property and an abrasion resistance rather than a rubber composition containing a modified natural rubber which is modified by a conventional polar group-containing monomer and in which the polar groups are present in various parts of a natural rubber molecule.

The tire of the present invention is a tire prepared by using the rubber composition for any of tire members.

Effects of the Invention

According to the present invention, a modified natural rubber in which a polar group is introduced into a molecular end of natural rubber is obtained, and a rubber composition prepared by using the same is excellent in a low hysteresis loss property and an abrasion property. A tire prepared by using the rubber composition for a tire member is excellent in a low heat build-up and durability.

MODE FOR CARRYING OUT THE INVENTION

The natural rubber latex used as a raw material for the modified natural rubber of the present invention shall not specifically be restricted, and field latexes, ammonia-treated latexes, centrifuged latexes, deproteinized latexes treated with a surfactant and an enzyme and latexes obtained by combining them can be used. Raw material latexes in which a purity is raised are preferably used in order to reduce side reactions.

Usually, a protein and a phospholipid are bonded to a molecular end of the above natural rubber, and it is estimated that the proteins themselves and the phospholipids themselves present at the ends are further bonded and associated to form a highly branched structure. The phospholipids forming the above branched structure are hydrolyzed.

The phospholipid can be hydrolyzed by a publicly known method, and a method described in, for example, International Publication WO2004/052935 can be applied thereto.

A method for hydrolyzing the phospholipid includes a method in which alkali is added to a natural rubber latex or the natural rubber latex is subjected to enzymatic treatment with lipase and/or phospholipase.

The alkali includes sodium hydroxide, potassium hydroxide and the like. The lipase and the phospholipase shall not specifically be restricted, and any of those originating in bacteria, those originating in mycotic bacteria and those originating in yeasts can be used. The lipase and the phospholipase have 100 (U/g) or more, preferably 1000 (U/g) or more, more preferably 10000 (U/g) or more and further preferably 100000 (U/g) or more. The lipase and phospholipase include Lipase M "Amano" 10 (manufactured by Amano Enzyme Inc.), Lipase OF (manufactured by Meito Sangyo Co., Ltd.), Phospholipase A1 (manufactured by Daiichi Sankyo Company, Limited) and the like which are commercial products.

An addition amount of the lipase and/or the phospholipase described above in the enzymatic treatment falls in a range of preferably 0.005 to 10 parts by mass, particularly preferably 0.01 to 1.0 part by mass based on 100 parts by mass of a solid component in the natural rubber latex. If the addition amount falls in the ranges described above, the phospholipid contained in the natural rubber latex is suitably decomposed.

If an addition amount (total amount) of the lipase and/or the phospholipase is less than 0.005 part by mass, decomposition reaction of the phospholipid is insufficiently carried out. If it exceeds 10 parts by mass, fatty acids contained in the natural rubber are almost decomposed, and strain induced crystallinity of the rubber is reduced to result in reduction in a tensile strength and abrasion resistance.

In adding the above enzyme, capable of being used as other additives, for example, a pH controlling agent are phosphates such as potassium primary phosphate, potassium secondary phosphate and sodium phosphate, acetates such as potassium acetate and sodium acetate, acids such as sulfuric acid, acetic acid, hydrochloric acid, nitric acid, formic acid, citric acid, succinic acid or salts thereof, or ammonia, sodium hydroxide, potassium hydroxide, sodium carbonate, sodium hydrogencarbonate and the like.

The enzymatic treatment described above is carried out at a temperature of 70° C. or lower, preferably 60° C. or lower and more preferably 50° C. or lower. If the enzymatic treatment temperature exceeds 70° C., stability of the natural rubber latex is reduced, and the latex is coagulated during the enzymatic treatment. After coagulated, the decomposition effect exerted by the enzyme is reduced.

Further, the enzymatic treatment of the natural rubber latex is carried out preferably by using a surfactant in combination. Nonionic surfactants, anionic surfactants, cationic surfactants and amphoteric surfactants can be used as the surfactant, and particularly the nonionic surfactants and the anionic surfactants are preferably used.

Suited as the nonionic surfactants are, for example, polyoxyalkylene ethers, polyoxyalkylene esters, polyhydric alcohol fatty acid esters, sugar fatty acid esters, alkyl polyglycosides and the like.

For example, carboxylic acid base surfactants, sulfonic acid base surfactants, sulfuric acid ester base surfactants, phosphoric acid ester base surfactants and the like are suited as the anionic surfactants.

The carboxylic acid base surfactants include, for example, fatty acid salts, polycarboxylic acid salts, rhodinic acid salts, dimeric acid salts, polymeric acid salts, tall oil fatty acid salts and the like. The sulfonic acid base surfactants include, for example, alkylbenzenesulfonic acid salts, alkylsulfonic acid salts, alkylnaphthalenesulfonic acid salts, naphthalenesulfonic acid salts, diphenyl ether sulfonic acid salts and the like. The sulfuric acid ester base surfactants include, for example, alkylsulfuric acid ester salts, polyoxyalkylenealkylsulfuric acid ester salts, polyoxyalkylene alkylphenyl ether sulfuric acid salts, tristyrenated phenol sulfuric acid ester salts, polyoxyalkylene distyrenated phenol sulfuric acid ester salts and the like. The phosphoric acid ester base surfactants include alkylphosphoric acid ester salts, polyoxyalkylenephosphoric acid ester salts and the like.

The natural rubber latex subjected to the enzymatic treatment in the manner described above is controlled in a pH and used for reaction with the polar group-containing compound as it is or after concentrating the rubber component by means of a centrifugal separator.

The phospholipid-hydrolyzed natural rubber obtained by the method described above is hydrolyzed in a bonded lipid at an end of a natural rubber molecular chain and is provided with a hydroxyl group. Condensing of the hydroxyl group with the compound having a polar group which is reacted with a hydroxyl group makes it possible to readily introduce the polar group into an end of the natural rubber molecule.

The specific examples of the polar group include an amino group, an imino group, a nitrile group, an ammonium group, an imide group, an amide group, a hydrazo group, an azo group, a diazo group, a hydroxyl group, a carboxyl group, a carbonyl group, an epoxy group, an oxycarbonyl group, a thiol group, a nitrogen-containing heterocyclic group, an oxygen-containing heterocyclic group, a tin-containing group, an alkoxysilyl group and the like. The above polar groups can be bonded with carbon black, silica and the like which are fillers.

The compound having a polar group which is reacted with a hydroxyl group includes compounds having a carboxyl group, an aldehyde group, a carbonyl group, an alkoxyl group, a hydroxyl group, an isocyanato group and the like in addition to the polar groups described above, and particularly polar group-containing carboxylic acids are preferably used.

The compound having an amino group as the polar group includes compounds having at least one amino group selected from primary, secondary and tertiary amino groups in a molecule. Among the above compounds having amino groups, the tertiary amino group-containing compounds are particularly preferred. The amino group-containing compounds may be used alone or in combination of two or more kinds thereof above.

In this connection, the primary amino group-containing compounds include, for example, 7-aminoheptanoic acid, β-alanine and the like.

The secondary amino group-containing compounds include, for example, 7-(ethylamino)heptanoic acid and the like.

The tertiary amino group-containing compounds include, for example, 7-(diethylamino)heptanoic acid and the like.

A nitrogen-containing heterocyclic group may be contained in place of the amino group, and the nitrogen-containing heterocyclic group includes, for example, pyrrole, histidine, imidazole, triazolidine, triazole, triazine, pyridine, pyrimidine, pyrazine, indole, quinoline, purine, phenazine, pteridine, melamine and the like. The nitrogen-containing heterocyclic group may contain other hetero atoms in a ring. A compound having a pyridyl group includes, for example, isonicotinic acid and the like.

The nitrile group-containing compounds described above include, for example, 7-cyanoheptanoic acid and the like, and the above nitrile group-containing compounds may be used alone or in combination of two or more kinds thereof.

The hydroxyl group-containing compounds include compounds having at least one hydroxyl group in a molecule. Hydroxyl group-containing carboxylic acid includes, for example, 6-hydroxyhexanoic acid and the like. The hydroxyl group-containing compounds may be used alone or in combination of two or more kinds thereof.

The carboxyl group-containing compounds include pimelic acid and the like. The carboxyl group-containing compounds may be used alone or in combination of two or more kinds thereof above.

The compounds having an epoxy group include 6-(oxirane-2-yl)hexanoic acid and the like. The compounds having an epoxy group may be used alone or in combination of two or more kinds thereof above.

The polar group-containing compound which is soluble in a solvent may be added as it is or in the form of a solution. Also, the compound which is slightly soluble in a solvent is added preferably after emulsified.

In the reaction of a carboxylic acid with a hydroxyl group, a condensing agent may be added as a reaction accelerating agent. Carbodiimide base condensing agents, triazine base condensing agents, phosphonium base condensing agents, benzotriazole base condensing agents, imidazole base condensing agents, polar group-containing halogenated carboxylic acids and the like can be used as the condensing agent. To be specific, it includes, for example, EDC (1-ethyl-3-(3-dimethylaminopropyl)carbodiimide hydrochloride),
DMT-MM (4-(4,4-dimethoxy-1,3,5-triazine-2-yl)-4-methylmorpholinium chloride),
BOP (benzotriazole-1-yl-oxy-tris(dimethylamino)phosphonium hexafluorophosphate),
PYBOP (benzotriazole-1-yl-oxy-tripyrrolidinophosphonium hexafluorophosphate),
HBTU (o-(benzotriazole-1-yl)-N,N,N',N'-tetramethyluronium hexafluorophosphate),
1,2-benzoisothiazoline-3-one and the like.

Further, HOBT (1-hydroxybenzotriazole), DMAP (4-dimethylaminopyridine), HOSU (N-hydroxysuccinimide), HOAT (1-hydroxy-7-azabenzotriazole), TBTU (o-(benzotriazole-1-yl)-N,N,N',N'-tetramethyluronium tetrafluoroborate) and the like are preferably added in order to enhance activity of the condensing agent. Among them, the combination of EDC and DMAP is desirable since the reaction is expedited at a high yield.

The condensing agent and the accelerating agent which are soluble in a solvent may be added as they are or in the form of a solution. Also, the compounds which are slightly soluble in a solvent are added preferably after emulsified.

In order to react the foregoing polar group-containing compound which reacts with a hydroxyl group with a molecule of the natural rubber in which phospholipid is hydrolyzed, the polar group-containing compound and the condensing agent for accelerating the reaction are added to a solution prepared by dissolving the above natural rubber in a solvent such as toluene and stirred at a prescribed temperature, whereby the polar group-containing compound is condensed with an end of the natural rubber molecule. In addition of the polar group-containing compound to the phospholipid-hydrolyzed natural rubber, an emulsifier may be added in advance to the solvent, or the polar group-containing compound may be emulsified by an emulsifier and then added to the solvent. The emulsifier which can be used for emulsifying the phospholipid-hydrolyzed natural rubber solution and/or the polar group-containing compound shall not specifically be restricted and includes nonionic surfactants such as polyoxyethylene lauryl ether.

It is important for enhancing the low hysteresis loss property and the abrasion resistance without deteriorating processability of the rubber composition that the polar group-containing compound is evenly introduced into the respective molecules of the natural rubber. Accordingly, the modification reaction described above is carried out preferably while stirring, and a reaction vessel is charged with the reaction components such as, for example, the phospholipid-hydrolyzed natural rubber, the polar group-containing compound to react them at 20 to 60° C. for 2 to 12 hours, whereby obtained is the modified natural rubber in which the polar group-containing compound is condensed with and added to the molecules of the natural rubber.

A polar group content of the modified natural rubber falls in a range of preferably 0.0005 to 0.2% by mass, more preferably 0.005 to 0.1% by mass based on the rubber component in the modified natural rubber. If a polar group content of the modified natural rubber is less than 0.0005% by mass, a low hysteresis loss property and abrasion resistance of the rubber composition can not sufficiently be improved in a certain case. Also, if a polar group content of the modified natural rubber exceeds 0.2% by mass, excellent physical characteristics intrinsic to the natural rubber such as viscoelasticity, an S-S characteristic (a stress-strain curve in a tensile tester) are changed to a large extent, and the excellent physical characteristics intrinsic to the natural rubber are damaged. In addition thereto, processability of the rubber composition is likely to be deteriorated to a large extent.

The modified natural rubber obtained in the manner described above is reprecipitated by using a poor solvent such as alcohol and water, recovered and washed, and then it is dried by means of a dryer such as a vacuum dryer, an air dryer and a drum dryer, whereby a modified natural rubber of a solid state is obtained. In this connection, the poor solvent for reprecipitation used for recovering the modified natural rubber shall not specifically be restricted and includes water, alcohols such as ethanol and 2-propanol, acetone and mixed solvents of the poor solvents themselves.

The rubber composition of the present invention can contain an unmodified natural rubber and various synthetic rubbers as the rubber component in addition to the modified natural rubber described above.

The rubber composition of the present invention can suitably be compounded with compounding ingredients usually used in the rubber industry, including fillers such as carbon black and silica, sulfur, vulcanization accelerators, silane coupling agents, antioxidants, zinc oxide, stearic acid and the like in addition to the rubber component described above according to the purposes. Further, the rubber composition of the present invention can be produced by mixing by means of a mixing machine such as a milling roll and an internal mixer.

The tire of the present invention is characterized by using the rubber composition described above for any of tire parts, and in this connection, the tire part is preferably a tread. Tires prepared by using the rubber composition for a tread are particularly excellent in a low hysteresis loss property (low heat build-up) and an abrasion property. The tire of the present invention shall not specifically have any restriction as long as the rubber composition is used for any of the tire parts, and it can be produced according to an ordinary process. Inert gases such as nitrogen, argon and helium in addition to usual air or air controlled in an oxygen partial pressure can be used as gas filled into the tire.

EXAMPLES

The present invention shall be explained below in detail with reference to examples and comparative examples, but the present invention shall by no means be restricted to the examples shown below.
Production of Modified Natural Rubber:

Production Example 1

Levenol WX (manufactured by Kao Corporation) 1.5 g was added as a surfactant to 1000 g of a latex prepared by adding water to a natural rubber latex clone species GT-1 obtained by treating with $NH_3$ 0.4% by mass to have 15% by mass of a dried rubber component (DRC), and the mixture was sufficiently dispersed by stirring. Next, 0.15 g of lipase (Lipase M "Amano" 10, manufactured by Amano Enzyme Inc.) was added thereto, and the mixture was sufficiently dispersed by stirring and then left standing still for 15 hours.

The above latex was subjected to centrifugal separation at a revolution of 7500 rpm by means of a latex separator (manufactured by Saito Separator Limited) to thereby obtain a condensed latex having a dry rubber concentration of 60% by mass.

Next, formic acid was added to the latex to control a pH thereof to 4.7, whereby it was coagulated. This solid was treated five times by means of a creper and turned into crumbs by passing through a shredder, and then it was dried at 110° C. for 210 minutes by means of a hot air dryer to obtain a natural rubber.

The natural rubber 150 g was dissolved in toluene, and 0.13 g of 7-aminoheptanoic acid was added to the solution to react them at room temperature for 3 hours while stirring, whereby modified natural rubber A to which a polar group was added was obtained.

Production Example 2

The production was carried out on the same conditions as in Production Example 1 to obtain modified natural rubber B, except that in Production Example 1, 0.14 g of EDC (1-ethyl-3-(3-dimethylaminopropyl)carbodiimide hydrochloride) and 0.08 g of DMAP (N,N-dimethyl-4-aminopyridine) were added after adding 0.13 g of 7-aminoheptanoic acid.

Production Examples 3 to 16

The productions were carried out on the same conditions to obtain modified natural rubbers C to P, except that 0.08 g of β-alanine was added in Production Example 3; 0.16 g of 7-ethylaminoheptanoic acid was added in Production Example 4; 0.14 g of 7-cyanoheptanoic acid was added in Production Example 5; 0.14 g of 7-oxooctanoic acid was added in Production Example 6; 0.34 g of 4-tributyltinbutanoic acid was added in Production Example 7; 0.17 g of 4-trimethylsilylbenzoic acid was added in Production Example 8; 0.17 g of 5-(acetylcarbamoyl)pentanoic acid was added in Production Example 9; 0.13 g of 6-hydraznylhexanoic acid was added in Production Example 10; 0.14 g of 5-(2-methyldiazenyl)pentanoic acid was added in Production Example 11; 0.12 g of 6-hydroxyhexanoic acid was added in Production Example 12; 0.14 g of pimelic acid was added in Production Example 13; 0.11 g of isonicotinic acid was added in Production Example 14; 0.24 g of 5-(triethoxysilyl)pentanoic acid was added in Production Example 15; and 0.15 g of 7-aminoheptanoic chloride was added in Production Example 16 each in place of adding 0.13 g of 7-aminoheptanoic acid in Production Example 2.

Production Examples 17 to 18

The productions were carried out on the same conditions to obtain modified natural rubbers Q and R, except that 0.15 g of Phospholipase A1 (manufactured by Daiichi Sankyo Co., Ltd.) was added in Production Example 17; and 12 g of a 5% sodium hydroxide aqueous solution was added in Production Example 18 each in place of adding 0.15 g of lipase in Production Example 2.

Production Example 19

Levenol WX (manufactured by Kao Corporation) 1.5 g was added as a surfactant to 1000 g of a latex prepared by adding water to a natural rubber latex clone species GT-1 obtained by treating with $NH_3$ 0.4% by mass to have 15% by mass of DRC, and the mixture was sufficiently dispersed by stirring. Next, 0.15 g of lipase (Lipase M "Amano" 10, manufactured by Amano Enzyme Inc.) was added thereto, and the mixture was sufficiently dispersed by stirring and then left standing still for 15 hours.

The latex was subjected to centrifugal separation at a revolution of 7500 rpm by means of a latex separator (manufactured by Saito Separator Limited) to thereby obtain a condensed latex having a dry rubber concentration of 60% by mass.

The latex was dropwise added to toluene while stirring and sufficiently dispersed, and then 0.13 g of 7-aminoheptanoic acid, 0.14 g of EDC (1-ethyl-3-(3-dimethylaminopropyl)carbodiimide hydrochloride) and 0.08 g of DMAP (N,N-dimethyl-4-aminopyridine) were added thereto to react them at room temperature for 3 hours while stirring. Reprecipitation thereof was carried out by using a mixed solution of methanol and 2-propanol to recover a rubber component, and the solvents were volatilized, whereby a polar group-added modified natural rubber S was obtained.

Production Example 20

Levenol WX (manufactured by Kao Corporation) 1.5 g was added as a surfactant to 1000 g of a latex prepared by adding water to a natural rubber latex clone species GT-1 obtained by treating with $NH_3$ 0.4% by mass to have 15% by mass of DRC, and the mixture was sufficiently dispersed by stirring. Next, 0.15 g of lipase (Lipase M "Amano" 10, manufactured by Amano Enzyme Inc.) was added thereto, and the mixture was sufficiently dispersed by stirring and then left standing still for 15 hours.

The latex was subjected to centrifugal separation at a revolution of 7500 rpm by means of a latex separator (manufactured by Saito Separator Limited) to thereby obtain a condensed latex having a dry rubber concentration of 60% by mass.

Added thereto were 0.5 g of 1,2-benzisothiaziline-3-one and 5.0 g of a surfactant ("SS-40N", manufactured by Kao Corporation), and formic acid was slowly dropwise added thereto to control a pH thereof to 7.0.

Added thereto were 0.13 g of 7-aminoheptanoic acid, 0.14 g of EDC (1-ethyl-3-(3-dimethylaminopropyl)carbodiimide hydrochloride) and 0.08 g of DMAP (N,N-dimethyl-4-aminopyridine) to react them at room temperature for 3 hours while stirring, whereby a polar group-added modified natural rubber latex was obtained.

Next, formic acid was added to the latex to control a pH thereof to 4.7, whereby it was coagulated. This solid matter was treated five times by means of a creper and turned into crumbs by passing through a shredder, and then it was dried at 110° C. for 210 minutes by means of a hot air dryer to obtain modified natural rubber T.

Production Example 21

Formic acid was added to 1000 g of a latex prepared by adding water to a natural rubber latex clone species GT-1 obtained by treating with $NH_3$ 0.4% by mass to control a pH of the latex to 4.7, whereby it was coagulated. This solid was treated five times by means of a creper and turned into crumbs by passing through a shredder, and then it was dried at 110° C. for 210 minutes by means of a hot air dryer to obtain modified natural rubber U.

The production steps of Production Examples 1 to 20 are shown in the following Table 1, and the kinds of the polar group-containing monomers and the addition amounts in the modified natural rubbers A to S obtained above are shown in the following Table 2.

TABLE 1

Production Examples 1 to 18

Latex
| ← Surfactant
|
| ←Lipase/phospholipase/base
|   [Ester hydrolysis]
| Left standing for one night
↓
Centrifugal separation
↓
Formic acid coagulation/grain refining/drying
↓
Dissolved in toluene
| ←Polar group
| ←Condensing agent/base
|   [Added a polar group]
| Stirring for a while
↓
Completion Production Example 19

Latex
| ← Surfactant
|
| ←Lipase
|   [Ester hydrolysis]
| Left standing for one night
↓
Centrifugal separation
|
| Dropwise adding
|
↓
Dissolved in toluene
| ←Polar group
| ←Condensing agent/base
|   [Added a polar group]
| Stirring for a while
↓
Completion Production Example 20

Latex
| ← Surfactant
|
| ←-Lipase

TABLE 1-continued

```
     |            Ester hydrolysis
     |         Left standing for one night
     ↓
Centrifugal
separation
     |
     |            ←Polar group
     |
     |            ←Condensing agent/base
     |            Added a polar group
     |            Stirring for a while
     ↓
Formic acid
coagulation/grain
refining/drying
Completion
```

TABLE 2

| Production Example | Natural rubber | Polar group-containing monomer | Addition amount (g) |
|---|---|---|---|
| 1 | modified natural rubber A | 7-aminoheptanoic acid | 0.13 |
| 2 | modified natural rubber B | 7-aminoheptanoic acid | 0.13 |
| 3 | modified natural rubber C | β-alanine | 0.08 |
| 4 | modified natural rubber D | 7-ethylamino-heptanoic acid | 0.16 |
| 5 | modified natural rubber E | 7-cyanoheptanoic acid | 0.14 |
| 6 | modified natural rubber F | 7-oxooctanoic acid | 0.14 |
| 7 | modified natural rubber G | 4-tributyltin-butanoic acid | 0.34 |
| 8 | modified natural rubber H | 4-trimethylsilyl-benzoic acid | 0.17 |
| 9 | modified natural rubber I | 5-(acetylcarbamoyl)-pentanoic acid | 0.17 |
| 10 | modified natural rubber J | 6-hydrazinylhexanoic acid | 0.13 |
| 11 | modified natural rubber K | 5-(2-methyl-diazenyl)pentanoic acid | 0.14 |
| 12 | modified natural rubber L | 6-hydroxyhexanoic acid | 0.12 |
| 13 | modified natural rubber M | pimelic acid | 0.14 |
| 14 | modified natural rubber N | isonicotinic acid | 0.11 |
| 15 | modified natural rubber O | 5-(triethoxysilyl)-pentanoic acid | 0.24 |
| 16 | modified natural rubber P | 7-aminoheptanoic chloride | 0.15 |
| 17 | modified natural rubber Q | 7-aminoheptanoic acid | 0.13 |
| 18 | modified natural rubber R | 7-aminoheptanoic acid | 0.13 |
| 19 | modified natural rubber S | 7-aminoheptanoic acid | 0.13 |
| 20 | modified natural rubber T | 7-aminoheptanoic acid | 0.13 |

Examples 1 to 20 and Comparative Example 1

Compunding ingredients were added to modified natural rubbers A to T and natural rubber U in a recipe shown in a composition 1 of Table 3, and the mixtures were mixed by means of Plast mill to prepare rubber compositions.

Examples 21 to 40 and Comparative Example 2

Compounding ingredients were added to modified natural rubbers A to T and natural rubber U in a recipe shown in a composition 2 of Table 3, and the mixtures were mixed by means of Plast mill to prepare rubber compositions.

A Mooney viscosity, tensile strength (Tb), tan δ and abrasion resistance of the rubber compositions prepared in the recipe shown in the compositions 1 and 2 described above were measured and evaluated by the following methods. The results of the rubber compositions according to the composition 1 are shown in Table 4, and the results of the rubber compositions according to the composition 2 are shown in Table 5.

(1) Mooney Viscosity:

A Mooney viscosity $ML_{1+4}$ (130° C.) of the rubber composition was measured at 130° C. according to JIS K6300-1994.

(2) Tensile Strength:

A tensile test of a vulcanized rubber obtained by vulcanizing the rubber composition at 145° C. for 33 minutes was carried out according to JIS K6301-1995 to measure tensile strength (Tb). It is shown that the larger the tensile strength is, the better the fracture resistance is.

(3) Tan δ:

A loss tangent (tan δ) of a vulcanized rubber obtained by vulcanizing the rubber composition at 145° C. for 33 minutes was measured at a temperature of 50° C., a distortion of 5% and a frequency of 15 Hz by means of a viscoelasticity measuring equipment (manufactured by Rhemetric Scientific, Inc.). It is shown that the smaller the tan δ is, the better the low hysteresis loss property is.

(4) Abrasion Resistance:

A vulcanized rubber obtained by vulcanizing the rubber composition at 145° C. for 33 minutes was used to measure an abrasion amount at room temperature and a slip rate of 60% by means of a Lambourn abrasion tester, and the values were shown by an index respectively, wherein an inverse number of an abrasion amount in Comparative Example 1 was set to 100 in Table 4, and an inverse number of an abrasion amount in Comparative Example 2 was set to 100 in Table 5. It is shown that the larger the index value is, the smaller the abrasion amount is, and the better the abrasion resistance is.

TABLE 3

| Composition | 1 phr | 2 phr |
|---|---|---|
| Modified natural rubber*1 | 100 | 100 |
| Carbon black N339 | 50 | |
| Silica*2 | | 55 |
| Silane coupling agent*3 | | 5.5 |
| Aromatic oil | 5 | 10 |
| Stearic acid | 2 | 2 |
| Antioxidant 6C *4 | 1 | 1 |
| Zinc oxide | 3 | 3 |
| Vulcanization accelerator DZ *5 | 0.8 | |
| Vulcanization accelerator DPG *6 | | 1 |
| Vulcanization accelerator DM *7 | | 1 |
| Vulcanization accelerator NS *8 | | 1 |
| Sulfur | 1 | 1.5 |

*1: The kinds of the modified natural rubbers or the natural rubber used are shown in Table 4 and Table 5
*2: Nipsil AQ manufactured by Tosoh Silica Corporation
*3: Si69 manufactured by Degussa AG., bis(3-triethoxysilylpropyl) tetrasulfide
*4: N-(1,3-dimethylbutyl)-N'-phenyl-p-phenylenediamine
*5: N,N'-dichlorohexyl-2-benzothiazolylsulphenamide
*6: diphenylguanidine
*7: dibenzothiazyl disulfide
*8: N-t-butyl-2-benzothiazylsulphenamide

TABLE 4

Composition 1

| | Example | | | | | | | |
|---|---|---|---|---|---|---|---|---|
| | 1 | 2 | 3 | 4 | 5 | 6 | 7 | 8 |
| Modified natural rubber | A | B | C | D | E | F | G | H |
| Mooney viscosity (ML$_{1+4}$ 130° C.) | 64 | 63 | 64 | 71 | 65 | 71 | 70 | 67 |
| Tb (MPa) | 25.7 | 25.4 | 26.4 | 26.7 | 25.1 | 25.7 | 25.1 | 26.5 |
| tan δ | 0.170 | 0.159 | 0.158 | 0.163 | 0.160 | 0.162 | 0.164 | 0.155 |
| Abrasion resistance index | 105 | 108 | 109 | 108 | 108 | 108 | 107 | 110 |

| | Example | | | | | | | |
|---|---|---|---|---|---|---|---|---|
| | 9 | 10 | 11 | 12 | 13 | 14 | 15 | 16 |
| Modified natural rubber | I | J | K | L | M | N | O | P |
| Mooney viscosity (ML$_{1+4}$ 130° C.) | 62 | 64 | 68 | 66 | 71 | 65 | 72 | 72 |
| Tb (MPa) | 26.0 | 25.7 | 25.9 | 25.9 | 26.2 | 26.6 | 26.9 | 26.3 |
| tan δ | 0.163 | 0.161 | 0.155 | 0.157 | 0.167 | 0.162 | 0.170 | 0.168 |
| Abrasion resistance index | 108 | 108 | 110 | 109 | 107 | 108 | 103 | 106 |

| | Example | | | | Comparative Example 1 |
|---|---|---|---|---|---|
| | 17 | 18 | 19 | 20 | |
| Modified natural rubber | Q | R | S | T | U |
| Mooney viscosity (ML$_{1+4}$ 130° C.) | 65 | 69 | 65 | 64 | 64 |
| Tb (MPa) | 26.5 | 26.3 | 25.7 | 25.1 | 25.1 |
| tan δ | 0.171 | 0.156 | 0.164 | 0.171 | 0.188 |
| Abrasion resistance index | 105 | 109 | 107 | 101 | 100 |

TABLE 5

Composition 2

| | Example | | | | | | | |
|---|---|---|---|---|---|---|---|---|
| | 21 | 22 | 23 | 24 | 25 | 26 | 27 | 28 |
| Modified natural rubber | A | B | C | D | E | F | G | H |
| Mooney viscosity (ML$_{1+4}$ 130° C.) | 89 | 83 | 83 | 92 | 85 | 92 | 91 | 85 |
| Tb (MPa) | 25.4 | 24.8 | 25.9 | 26.2 | 24.6 | 25.2 | 24.7 | 25.9 |
| tan δ | 0.125 | 0.115 | 0.115 | 0.118 | 0.116 | 0.117 | 0.128 | 0.113 |
| Abrasion resistance index | 110 | 116 | 116 | 115 | 116 | 115 | 103 | 116 |

| | Example | | | | | | | |
|---|---|---|---|---|---|---|---|---|
| | 29 | 30 | 31 | 32 | 33 | 34 | 35 | 36 |
| Modified natural rubber | I | J | K | L | M | N | O | P |
| Mooney viscosity (ML$_{1+4}$ 130° C.) | 83 | 84 | 86 | 85 | 93 | 86 | 90 | 94 |
| Tb (MPa) | 25.5 | 25.2 | 25.4 | 25.3 | 25.7 | 26.1 | 26.2 | 25.9 |
| tan δ | 0.118 | 0.116 | 0.113 | 0.114 | 0.120 | 0.117 | 0.112 | 0.121 |
| Abrasion resistance index | 115 | 116 | 116 | 116 | 114 | 115 | 117 | 113 |

TABLE 5-continued

| | Composition 2 | | | | |
| --- | --- | --- | --- | --- | --- |
| | Example | | | | Comparative |
| | 37 | 38 | 39 | 40 | Example 2 |
| Modified natural rubber | Q | R | S | T | U |
| Mooney viscosity (ML$_{1+4}$ 130° C.) | 89 | 88 | 87 | 75 | 94 |
| Tb (MPa) | 26.1 | 25.8 | 25.2 | 24.9 | 25.1 |
| tan δ | 0.122 | 0.114 | 0.118 | 0.124 | 0.135 |
| Abrasion resistance index | 112 | 116 | 115 | 108 | 100 |

It can be found from comparison of Examples 1 to 40 with Comparative Examples 1 to 2 that the rubber compositions prepared by using modified natural rubbers A to S obtained by condensing and adding the polar group-containing compounds to the natural rubber molecules have a large effect of enhancing a low hysteresis loss property and abrasion resistance.

INDUSTRIAL APPLICABILITY

The rubber compositions prepared by using the modified natural rubbers of the present invention are rubber compositions which are excellent in a low hysteresis loss property and abrasion resistance, and they can suitably be used for tire members, particularly treads.

The invention claimed is:

1. A production process for a modified natural rubber, comprising:
   adding a phospholipid degradative enzyme or an alkali to a natural rubber latex to hydrolyze a phospholipid of a natural rubber molecule and
   then condensing a polar group-containing compound thereto to introduce the polar group into an end of the natural rubber molecule with an ester bond.

2. The production process for a modified natural rubber as described in claim 1, wherein the enzymatic treatment is carried out at a temperature of 70° C. or lower using lipase and/or phospholipase as the phospholipid degradative enzyme with an addition amount of 0.005 to 10 parts by mass based on 100 parts by mass of a solid component in the natural rubber latex.

3. The production process for a modified natural rubber as described in claim 1, wherein treatment with a surfactant is carried out in addition to the enzymatic treatment.

4. The production process for a modified natural rubber as described in claim 1, wherein after hydrolyzing the phospholipid of the natural rubber molecule, reaction of condensing the polar group-containing compound is carried out with a condensing agent.

5. The production process for a modified natural rubber as described in claim 4, wherein the condensing agent is at least one selected from the group consisting of carbodiimide base condensing agents, triazine base condensing agents, phosphonium base condensing agents, benzotriazole base condensing agents, imidazole base condensing agents and polar group-containing carboxylic halides.

6. The production process for a modified natural rubber as described in claim 1, wherein the polar group of the polar group-containing compound is at least one selected from the group consisting of an amino group, an imino group, a nitrile group, an ammonium group, an imide group, an amide group, a hydrazo group, an azo group, a diazo group, a hydroxyl group, a carboxyl group, a carbonyl group, an epoxy group, an oxycarbonyl group, a nitrogen-containing heterocyclic group, an oxygen-containing heteroyclic group, a tin-containing group and an alkoxysilyl group.

* * * * *